Feb. 3, 1953 E. H. MUSGROVE ET AL 2,627,581
RESISTANCE-REDUCING DEVICE FOR BRIDGED CIRCUITS
Filed July 29, 1950
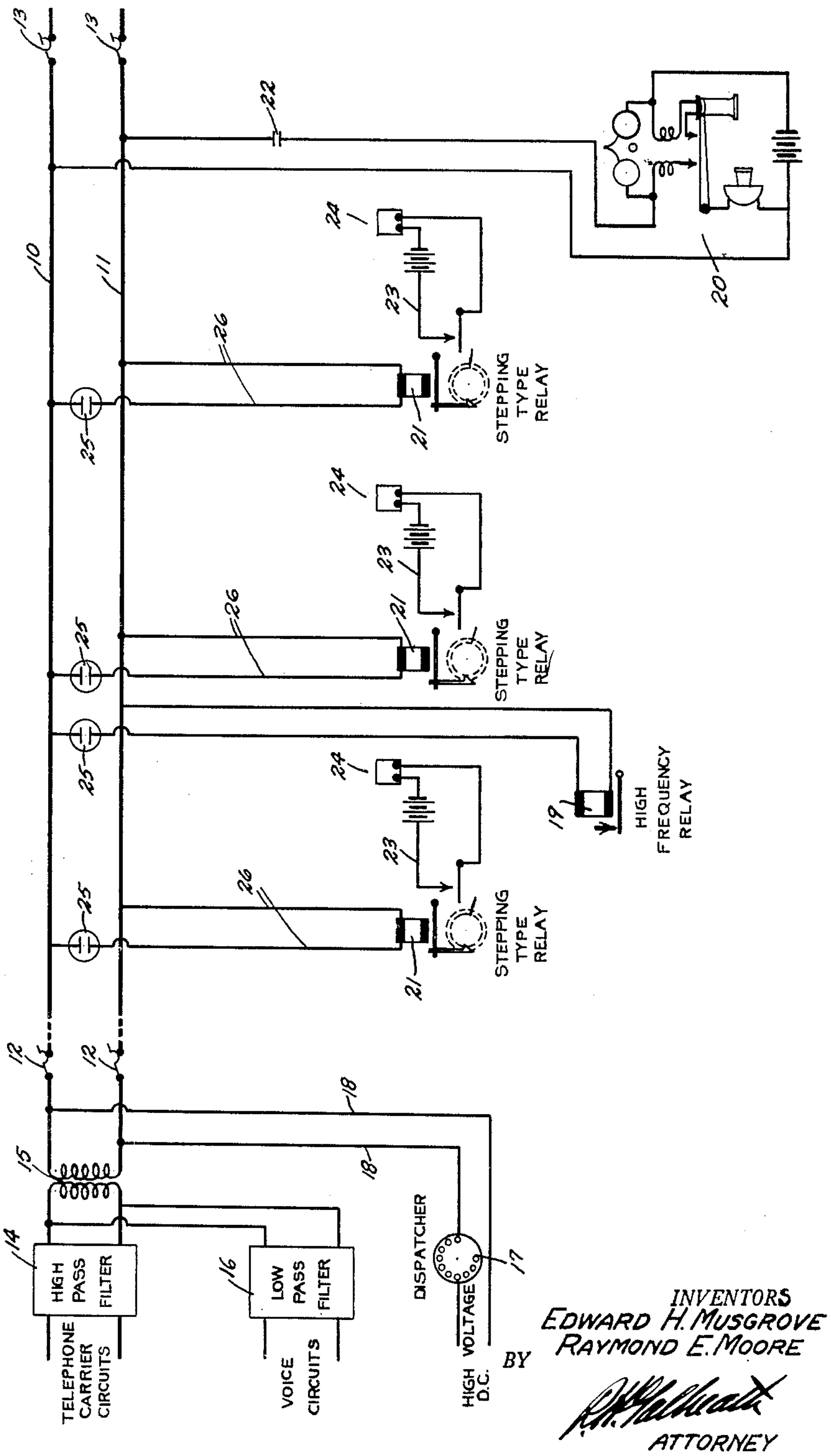
INVENTORS
EDWARD H. MUSGROVE
RAYMOND E. MOORE
BY
ATTORNEY Patented Feb. 3, 1953

2,627,581

UNITED STATES PATENT OFFICE 2,627,581

RESISTANCE-REDUCING DEVICE FOR BRIDGED CIRCUITS

Edward H. Musgrove and Raymond E. Moore, Denver, Colo.

Application July 29, 1950, Serial No. 176,688

3 Claims. (Cl. 307—2)

This invention relates to means for eliminating the low-voltage losses from wire circuits of the type used in railway communication systems.

The metallic circuits used for railway control and communication often are so excessively burdened with equipment permanently shunted across the line that telephone conversation is practically impossible, and the current delivery to repeater stations at the ends of line sections is insufficient to operate the line equipment.

The principal object of this invention is to provide means whereby the line will be cleared of substantially all bridged loads without interfering with the usual operation of the devices on the line.

Railway wire circuits have become so bridged with equipment that it is exceedingly difficult to segregate sections for resistance testing to locate breaks and other faults.

Another object of this invention is to provide means for eliminating all or substantially all bridged resistance on the line so that when a section of line is segregated it will be entirely clear for test purposes.

Railway wire circuits carry a variety of different types of stations bridged across the two line conductors, including telephones operating on carrier currents of differing frequencies, relays tuned to differing frequencies, and stepping type relays controlled by coded impulses. The stepping type relays control various circuits for giving signals, connecting phones with the main line, for opening the line at spaced remote points for testing purposes, etc.

The stepping relays and the high frequency relays are bridged directly across the two conductors 10 and 11 to create a constant connected load. With the addition of each relay circuit to the line there is a reduction in line resistance and a resulting reduction in the efficiency of the phone circuits until a point is reached when the addition of additional relay circuits renders the phone circuits practically useless.

This heavy, constantly connected load renders low-voltage D. C. line tests of the Wheatstone bridge type extremely difficult and often impossible.

This invention contemplates completely insulating or isolating all or substantially all of the stations along the line from the line conductors without interfering with the normal line operation, so that an infinite number of relay stations may be connected to the line without decreasing the circuit resistance, and without interfering with telephonic uses or low-voltage D. C. line tests for locating breaks or cross circuits.

The selective ringing or "party line" phones are at present usually insulated from the line by condensers so that they present no problem. The selective ringing equipment, however, and more particularly stepping type relay circuits, cannot operate through condensers, since they employ direct current or a very slow cycle alternating current. This invention contemplates placing insulating devices in the latter circuits which will conduct no current until the line voltage reaches a minimum above the maximum voltage employed for the telephone carrier and voice currents.

The voltages employed for telephone carrier, voice, and ringing circuits are usually in the vicinity of 12 volts and never exceed 25 volts. The voltages employed for operating selectors or stepping type relays, however, usually exceed 100 volts. Therefore, if an insulating device could be provided in the selector or stepping type relay circuits which required no current for its own operation, and which would pass current only when the line voltage exceeded, say 60 volts, telephone service would not be interfered with, since the selector relay circuits would create no line load at telephone operating voltages or at D. C. line test voltages.

It has been found that an ordinary "neon" tube placed in series with each selector circuit will effectively accomplish the above. The characteristics of the particular tube employed are such that all telephonic operational voltages are insufficient to ionize the neon, but voltages above the maximum telephonic voltage and below the usual selector or stepping relay operational voltage, will ionize the neon so as to pass current to the relay.

A tube which will ionize at from 50 to 100 volts would serve in the usual railway wire circuits. Tubes which ionize at 60 volts are in actual successful operation.

The accompanying drawing illustrates a portion of a typical railway wire circuit consisting of two track side conductors 10 and 11 extending several hundred miles and terminating at their extremities in terminal jacks 12 connecting them with the central station equipment and/or with jacks 13 connecting them to the adjoining line sections.

Low-voltage telephone carrier frequencies of from 8000 to 30,000 cycles are fed into the conductors 10 and 11 through a "high pass" filter 14 and a transformer 15. The lower telephone frequencies are fed into the transformer 15 from a "low pass" filter 16. High-voltage, coded direct current is imposed upon the conductors 10 and 11 from a dispatcher's interrupter 17 through leads 18. All of the above are typical central station equipment which can be totally disconnected from the conductors 10 and 11 by the jacks 12 for test purposes.

A high-voltage, preset frequency relay 19 is illustrated connected to the line and designed to close a circuit of any desired nature upon receipt of a high-voltage, preset frequency from the line. A typical selective ringing telephone circuit 20 is connected directly to the line through an isolating condenser 22. Stepping type relays or selectors for closing any desired circuits upon receipt of coded impulses from the dispatcher's station 17 are indicated at 21 included in relay circuits 26. Circuits adapted to be closed by the respective relays 21 upon receipt of a high-voltage, preset coded impulse through the dispatcher's interrupter 17, are indicated at 23. The circuits 23 operate any desired equipment, as indicated diagrammatically by a signal bell 24.

The above are simply illustrative of types of connected line stations. In a typical circuit there may be twenty of the phone circuits 20 and forty or more of the selectors or stepping relays 21. The average relay 21 has a resistance value of 21,000 ohms. With forty selectors connected directly across the line, the total line resistance would be reduced to approximately 500 ohms, which would be still further decreased by insulation losses until there would not be sufficient voltage to operate the phones or the repeater stations on the line.

The above losses are entirely eliminated in the present invention by placing neon tubes or similar ionizable gaseous elements 25 in all bridged circuits connected with the conductors 10 and 11 which are not already isolated or insulated by condensers, such as shown at 22. This more particularly applies to the selector or stepping relay circuits 26.

The tubes 24 would operate to pass current only when sufficient voltage was placed in the line to ionize the gas therein. Telephone carrier or physical telephone currents would not be sufficient to ionize the neon, and the line would function as a clear, unbridged circuit without losses. The dispatcher's interrupter or selector, however, operates from a current source exceeding 100 volts, which is more than sufficient to ionize the neon tubes so that operation of the stepping type relays along the conductors 10 and 11 is not affected, and the said relays would function as always.

Should it be desired to test the line for breaks or shorts with a Wheatstone bridge type tester, it is only necessary to open the jacks 12 and 13 which will act to totally insulate the conductor 10 from the conductor 11 so that low-voltage D. C. test current can be applied which will not pass through the tubes 24 nor the condensers 22, so that a perfect test can be made without consideration of the connected equipment.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. Means for eliminating low-voltage losses from a main circuit of the type having a plurality of parallel bridge circuits bridged across said main circuit, comprising: a two-element gaseous ionizing tube in circuit with each of said bridge circuits, said tube being capable of ionization only at voltages above the normal low-voltages of said main circuit so as to prevent direct current or low-voltage alternating currents from flowing from said main circuit through the said parallel bridge circuits.

2. Means for eliminating low-voltage losses from a main circuit of the type having a plurality of parallel bridge circuits bridged across said main circuit, comprising: a neon tube in circuit with each of said bridge circuits, said tube being capable of ionization only at voltages above the normal low-voltages of said main circuit so as to prevent direct current or low-voltage alternating currents from flowing from said main circuit through the said parallel bridge circuits.

3. A circuit comprising: a source of low-voltage current; a main circuit leading from said source of current; a telephone circuit bridged across said main circuit and being operable on the low-voltage of said main circuit; a condenser in said telephone circuit; a plurality of relay circuits positioned at spaced intervals along said main conductors, said relay circuits being connected in parallel relation with said main conductors; a gaseous ionizing tube placed in series with each of said relay circuits, said tube being capable of ionization only at voltages above the normal low-voltages of said main circuit so as to prevent the passage of low-voltage direct current from said main conductors to said relay circuits; and means for supplying high-voltage alternating current to said main circuit at intervals, said high-voltage current being sufficient to ionize said tubes to cause current to flow through said relay circuits.

EDWARD H. MUSGROVE.
RAYMOND E. MOORE.

REFERENCES CITED

The following references are of record in the file of this patent:

UNITED STATES PATENTS

| Number | Name | Date |
|---|---|---|
| 484,549 | Brace | Oct. 18, 1892 |
| 2,177,843 | Seeley | Oct. 31, 1939 |